United States Patent
Bechmann

[15] 3,677,155
[45] July 18, 1972

[54] LENS MOUNT

[72] Inventor: Gerhart Bechmann, Midland, Ontario, Canada

[73] Assignee: Ernst Leitz GmbH, Wetzlar, Germany

[22] Filed: Aug. 2, 1971

[21] Appl. No.: 168,032

[30] Foreign Application Priority Data

Aug. 13, 1970 Germany ..................P 20 40 227.1

[52] U.S. Cl. ...................................................95/44 C, 95/45
[51] Int. Cl. .........................................................G03b 13/02
[58] Field of Search ...................................95/44 C, 44 R, 45

[56] References Cited

UNITED STATES PATENTS 2,809,572  10/1953  Meinecke.................................95/44 C
3,029,720  4/1962  Leitz........................................95/44 C Primary Examiner—Samuel S. Matthews
Assistant Examiner—Michael D. Harris
Attorney—Krafft & Wells

[57] ABSTRACT

For setting a photographic objective to a specific object distance, the objective is provided with an inner lens barrel (2) wherein a plurality of lenses are mounted, and with an outer range adjustment ring (5). The lens barrel moves back and forward in axial direction upon rotation of the adjustment ring (8). A cam ring having its cam extending in axial backward direction is coaxially mounted around the lens barrel for joint back and forward movement. Mechanical means (6) interconnect the cam ring with the range adjustment ring so that the cam ring is both displaced axially and also rotated when the objective is set to a specific distance. A cam follower is tiltably provided in the lens mount having one arm projecting in the direction of the camera body. The arm moves back and forward during range adjustment as a function of the difference between the lens barrel displacement and the cam gradient and transmits information to the range finder in the camera body.

4 Claims, 2 Drawing Figures

Patented July 18, 1972 3,677,155

LENS MOUNT

BACKGROUND OF THE INVENTION

The present invention relates to the lens mount of a photographic objective which may be set to different object distances. More precisely to the mechanism for transmitting the distance to which the objective has been set to the range finder means in the camera body.

To those skilled in the art it is well known to adjust a photographic objective to the object distance by displacing the lenses along the optical axis of the objective so that the object will be imaged in focus on the film at a given object distance. The camera body comprises in many instances a split image range finder and it is also well known to couple the objective lenses to the movable element of the range finder. Displacement of the lenses is usually accomplished by means of an outer thread on the lens barrel which is in mesh with an inner thread on the range adjustment ring of the objective.

Further, it is well known to provide an annular cam on the adjustment ring extending in axial direction to the rear of the objective for rotation with the ring and to bring a cam follower in contact with the cam. The cam follower is a member of the camera body and controls the movement of the movable element of the range finder.

Such a design may readily be used when sufficient space is available between the lens elements and the bayonet mount of the objective on the camera body. However, with present day objectives of high relative openings, featuring at the same time a relatively short back focal distance, such prior art mounts can no longer be used. The space available for the mechanical elements is then needed for the lenses and it may be that the distance of the end of the cam follower from the optical axis is shorter than the radius of the most rearward lens. This means, in other words, that the cam follower is located still inside the circumference of this lens. Under such conditions if the range adjustment ring is provided with a circular cam ring this ring would cover the outer rim of the lens and would considerably decrease the brightness of the objective.

On the other hand, the fact that the cam follower has its end inside the lens circumference is of no or only little influence on the objective brightness since not all of the lens circumference but only one particular area is covered.

Such objectives require therefore that the cam follower be not operated by a circular cam ring but by a plunger which is movable in back and forward direction. It is, therefore, also already known to convert the rotary motion of the range adjustment ring into a back and forward movement of the plunger in parallel to the optical axis. Usually, this is accomplished by a thread gear and a rectilinear guidance of the plunger. Since, however, the distance of the movement of the cam follower has to be substantially smaller than the axial displacement of the lens barrel and has also to be smaller than the pitch of the thread in the thread gear it is, further, already known to displace the plunger by means of a differential thread gear which reduces the long movement of the lens barrel to the extent required for the plunger or for the cam follower respectively. Unfortunately, considerable space is also needed for such a differential thread gear which is not available with the above described types of objectives having a high relative opening and a short back focal distance.

It is therefore an object of the invention to provide mechanical means for actuating the plunger in photographic objectives of the above type, which mechanical means convert the rotary motion of the range adjustment ring into the back and forward plunger movement and which do not require the space needed for the differential thread gear.

SUMMARY OF THE INVENTION

According to the invention this object is attained by providing within the lens mount a lens barrel having an outer thread which is in engagement with the inner thread of the range adjustment ring for axially displacing the lens barrel upon rotation of the adjustment ring. At the rear end of the lens barrel, i.e., the end facing the camera body, a cam ring having a cam extending in axial direction is rotatably mounted. The cam ring is engaged in a slot by a pin which is positively secured to the range adjustment ring. As a consequence of this design the cam ring is both axially displaceable with the lens barrel and also rotatable thereon with the range adjustment ring.

A cam follower bears against the cam of the cam ring, which cam follower projects with its other end out of the rear of the objective and which is in the camera housing in an abutting connection with the lever for moving the movable member of the range finder device. As a result of the two movements of the cam ring, i.e., the movement in axial direction and the rotary movement, the cam follower is only displaced in axial direction according to the difference between the lens barrel displacement and the cam gradient.

Thus, the rotary cam ring on the lens barrel represents a specific type of a differential gearing and renders the same service as, for example, a differential thread gear, however, without requiring the space which is usually needed for the latter.

The design of the cam follower and the way it is mounted in the objective is optional. It is, however, suggested to design the cam follower as a tiltable lever which tilts about an axis intersecting the optical axis at a right angle. The cam follower may even be a ring which circumscribes concentrically the rear end of the lens barrel.

BRIEF DESCRIPTION OF THE DRAWINGS

The invention will be more readily comprehended from the following description when taken in conjunction with the appending drawings, wherein.

DESCRIPTION OF THE PREFERRED EMBODIMENT

Figure 1:
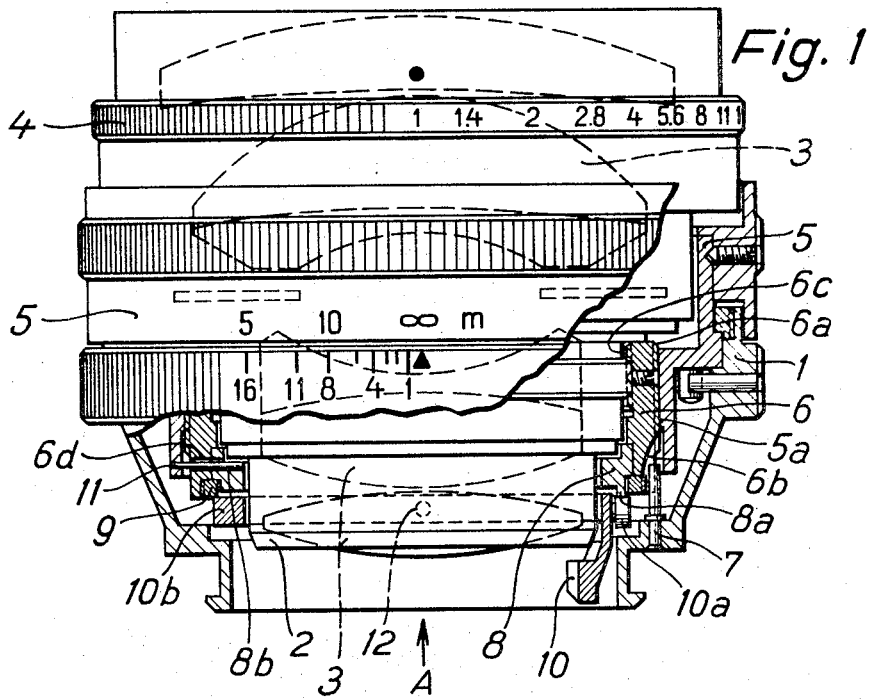
FIG. 1 shows schematically a photographic objective with the outer lens mount partially cut away.
Figure 2:
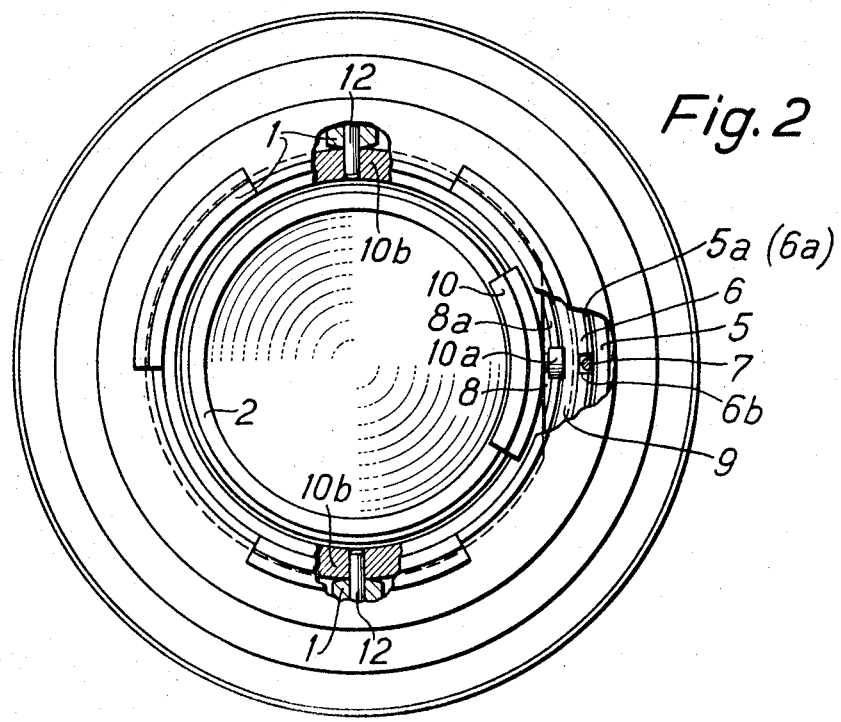
FIG. 2 is a view of the objective shown in FIG. 1 in the direction of arrow A.

Referring now to FIG. 1 the outer lens mount 1 comprises a lens barrel 2 wherein the lens elements 3 are mounted. The outer lens mount comprises further a range adjustment ring 5 and an f-stop adjustment ring 4 not being described in more detail. The range adjustment ring 5 is rotatable and is provided with an inner thread 5a. Into this inner thread 5a is threaded tubular member 6 by means of an outer thread 6a. A stationary pin 7 engages the tubular member 6 in a groove 6b so that the member 6 is guided rectilinearly in axial direction when the range adjustment ring 5 is rotated. The tubular member is further provided with an inner thread 6c into which the lens barrel 2 is positively threaded so that the tubular member and the lens barrel move as a unit.

In the rear end of the tubular member 6 there is provided an annular groove wherein a cam ring 8 is rotatably disposed and kept therein by a threaded retainer ring 9. The cam ring 8 has a cam 8a extending in axial direction to the rear of the objective. A cam follower 10 bears against the cam by means of a roller 10a which is rotatable on the cam follower.

As can best be seen from FIG. 1 a slit 8b is cut into the cam ring 8 and extends in axial direction. A pin 11 which is positively secured in the range adjustment ring 5 engages the slit 8b. In order to allow for a rotatory movement of the pin 11 together with the range adjustment ring 5 and also for a movement of the tubular member 6 in the direction of the optical axis, the tubular member 6 is provided with a deep recess 6d which extends along a substantial portion of the circumference of the tubular member.

The cam follower 10 is a portion of a ring 10b which is mounted concentrically to the rear end of the lens barrel 2. By means of a pin 12 in the stationary lens mount 1 the ring 10b is made pivotable about an axis which intersects the optical axis at right angles. A spring (not shown) keeps the cam follower 10 in engagement with the cam 8a.

The above described elements cooperate in the following manner for adjusting the lenses to the specific object distance and for transmitting an information on the lens position to the range finder device in the camera body:

For adjusting the objective to a specific object distance the range adjustment ring 5 has to be rotated. Thereby the tubular member 6 is displaced in the direction of the optical axis by the interengaging threads 5a and 6a. The lens barrel 2 moves together with the sleeve to which it is securely fixed, and so does the cam ring 8 which is rotatable at the end of the member 6.

However, at the same time the cam ring 8 rotates together with the range adjustment ring 5 because the pin 11 secured in the ring 5, projects into the cam ring slit 8b. Consequently, the surface of the cam 8 executes at the same time two movements or, in other words, the cam follower 10 undergoes an axial displacement which is caused by two different movements: the axial movement of the member 6 and the gradient of the cam 8a which comes into effect upon rotation of the cam ring 8. Both movements together convert the long axial movement of the tubular member 6 into the short axial movement of the cam follower which is required for connecting the range adjustment ring to the range finder device in the camera body.

What is claimed is:

1. The lens mount of a photographic objective having an optical axis and having means for transmitting information concerning the lens position along said optical axis to the movable member of the range finder means in the photographic camera body, the mount comprising:

a stationary tubular mount member adapted to be attached to the camera body;

a range adjustment ring rotatably supported on said stationary mount member;

a lens barrel arranged coaxially inside said stationary mount member;

means mechanically interconnecting said range adjustment ring and said lens barrel for displacing said lens barrel in the direction of the optical axis upon rotation of said range adjustment ring;

a cam ring being mounted rotatably on said lens barrel for joint movement therewith in axial direction when said range adjustment ring is rotated and comprising an annular cam extending in the rearward direction of said objective;

means interconnecting said cam ring and said range adjustment ring for joint rotation when said range adjustment ring is rotated so that during range adjustment said cam ring is both axially displaced and rotated about said optical axis; and a cam follower in abutting engagement with said cam so that during range adjustment said cam follower is displaced in axial direction by the difference between the axial displacement of said cam ring and the gradient of said cam, said cam follower comprising an arm extending to the rear of said objective for engagement with said range finder means in said camera body.

2. The lens mount as claimed in claim 1, wherein said cam follower is a lever having a form of a ring segment and being tiltably mounted with one end on the inner surface of said tubular mount member so as to tilt about an axis intersecting said optical axis at a substantially right angle.

3. The lens mount as claimed in claim 1, wherein said cam follower is a ring arranged coaxially to said optical axis and being tiltably mounted on the inner surface of said tubular mount member so as to tilt about an axis intersecting said optical axis at a substantially right angle.

4. The lens mount as claimed in claim 1, and further comprising spring means for keeping said cam follower in a resilient abutting engagement with said cam.

* * * * *